United States Patent Office 3,787,560
Patented Jan. 22, 1974

3,787,560
METHOD OF DECOMPOSING NITROGEN OXIDES
Ruth E. Stephens, Royal Oak, Mich., assignor to Ethyl Corporation, Richmond, Va.
No Drawing. Continuation-in-part of abandoned application Ser. No. 60,650, Aug. 3, 1970, which is a division of abandoned application Ser. No. 692,587, Dec. 22, 1967. This application Jan. 24, 1972, Ser. No. 220,440
Int. Cl. B01d 53/34
U.S. Cl. 423—239                6 Claims

ABSTRACT OF THE DISCLOSURE

The oxides of nitrogen content of a gas stream can be reduced by contacting the gas stream with a catalyst consisting essentially of neodymium oxide and barium oxide on a suitable support at elevated temperatures. The catalysts are especially useful in reducing the nitric oxide content of the exhaust gas of internal combustion engines.

CROSS REFERENCE TO RELATED APPLICATIONS

This application is a continuation-in-part of application Ser. No. 60,650 filed Aug. 3, 1970, now abandoned, which in turn is a division of application Ser. No. 692,687 filed Dec. 22, 1967, now abandoned.

BACKGROUND

The exhaust gas of internal combustion engines contains unburned hydrocarbons, carbon monoxide, nitrogen oxides and oxygen, among other materials. Investigators have reported that nitrogen oxides in the presence of sunlight lead to ozone formation and that ozone reacts with hydrocarbon substituents in the atmosphere to form noxious materials. Therefore, extensive research has been carried out directed at means of removing the precursor materials, nitrogen oxides and hydrocarbons, from the atmosphere. The present invention describes a catalyst, a method of using this catalyst to reduce the oxides of nitrogen content of the atmosphere py contacting exhaust gas of internal combustion engines or other exhaust gases containing oxides of nitrogen with a catalyst.

SUMMARY OF INVENTION

This invention relates to a catalyst eminently useful for decomposing oxides of nitrogen. In particular, this invention relates to a catalyst consisting essentially of neodymium oxide and barium oxide impregnated on a suitable support and to the use of this catalyst in decomposing oxides of nitrogen.

An object of this invention is to provide a catalyst useful for decomposing nitrogen oxides. The catalyst can be used in reducing the nitrogen oxide content of the exhaust gas of internal combustion engines or in reducing the nitrogen oxide content of other effluent exhaust streams such as that emitted during the manufacture of nitric acid from ammonia.

The objects of this invention are accomplished by providing a catalyst consisting essentially of from 0.001 to 15 weight percent neodymium in an oxide form and from 0.0001 to 15 weight percent barium in an oxide form impregnated on a suitable support.

In a preferred embodiment, the catalyst consists essentially of from 0.001 to 15 weight percent neodymium in an oxide form and from 0.001 to 15 weight percent barium in an oxide form impregnated on a support selected from the group consisting of zirconia, alumina-zirconia, calcium aluminate, alumina-titania, alumina, magnesia, alumina-magnesia, silica, silica-alumina, silica-magnesia, silicon carbide, zinc oxide, mullite, synthetic and natural zeolites, silica-zirconia, kaolin, silica-titania, magnesia-zirconia, magnesia-titania, zirconia-titania, alumina-silica-magnesia, alumina-silica-zirconia, alumina-silica-titania, alumina-magnesia-zirconia, alumina-magnesia-titania, alumina-zirconia-titania, silica-magnesia-zirconia, silica-magnesia-titania, silica-zirconia-titania, magnesia-zirconia-titania, or mixtures of these support materials.

In a highly preferred embodiment, the support material comprises a substantial amount of zirconia. By a substantial amount is meant above about 50 percent. The balance may be other typical support materials. An especially useful support is zircon, which contains about 60 percent zirconia and 30 percent silica, the balance being mainly alumina.

The catalyst can be prepared by any one of many methods known to catalyst manufacturers. A suitable support can be merely impregnated with a solution of a soluble salt of neodymium and barium. Examples of such salts include neodymium nitrate, neodymium acetate, barium nitrate and barium acetate. After impregnation, the support is calcined to decompose the salts of neodymium and barium to an oxide form. Another method is to mix neodymium and barium oxide with a precursor of the support material. For example, an alumina gel can be formed by adding sodium hydroxide to an acidic solution of an aluminum salt such as aluminum nitrate dissolved in aqueous nitric acid. Neodymium oxide and barium oxide can be mixed with this gel in the proper amount, forming a paste which is then extruded, dried, and calcined, resulting in a suitable catalyst. Likewise, other support materials may be included in the above process such as kaolin, silica and zirconia. In a similar manner, the neodymium and barium salts may be in solution with a water soluble aluminum salt such as aluminum nitrate in dilute nitric acid and co-precipitated with the alumina gel formed when base is added. The resulting gel can be extruded, dried and calcined or it may be mixed with other dry support material such as kaolin, silica, and the like, forming a paste which can then be extruded, dried and calcined.

The following examples will serve to illustrate several of the methods available for preparing the barium oxide promoted neodymium oxide catalysts of this invention. All parts are by weight unless otherwise specified.

EXAMPLE 1

In an open vessel was placed 6 parts of water, 4.38 parts (0.01 mole part) of neodymium nitrate hexahydrate and 0.05 part (.00025 mole part) of barium nitrate. After a solution formed, 9.25 parts of zircon, a catalyst support comprising a substantial amount of zirconia (Zircon-Norton LZS 4045 3/16" spheres), was added and the mixture allowed to stand until the solution had impregnated the support. The impregnated zirconia support was then calcined at 700° C. for an hour, resulting in a catalyst containing 12.3 weight percent neodymium and 0.36 weight percent barium, both in oxide forms, on a support comprising a substantial amount of zirconia.

EXAMPLE 2

In the vessel of Example 1 place 438 parts of neodymium nitrate hexahydrate, 2.61 parts of barium nitrate, and 500 parts of water. Mix until dissolved and then add 730 parts of alumina pellets (primarily gamma-alumina). Let the mixture stand until the solution impregnates the alumina. When the aqueous phase is almost gone, warm the mixture to 100° C. to evaporate off excess water and then calcine the impregnated alumina at 700° C. for 2 hours. The catalyst formed consists essentially of 15 percent neodymium and 0.15 percent barium, both in oxide forms, on an alumina support.

EXAMPLE 3

In the mixing vessel of Example 1 place 448 parts of neodymium nitrate hexahydrate, 2610 parts of barium nitrate, and 4000 parts of water containing 10 parts of $HNO_3$. To this add 7500 parts of 6–10 mesh zinc oxide pellets. Allow this to stand until the aqueous phase is substantially absorbed and then warm it to 100° to dry the catalyst. When dry, calcined the catalyst at 700° C. for 2 hours. The resulting catalyst contains 1.5 percent neodymium and 15 percent barium, both in an oxide form, impregnated on a zinc oxide support.

In the above example, other supports can be used with good results, such as zeolites, magnesia, silica, silica alumina, and the like.

EXAMPLE 4

A paste is made by digesting a mixture of 50 parts of alumina gel and 40 parts of kaolin with 10 percent nitric acid. A mixture of 10 parts of neodymium oxide and 0.01 part of barium oxide is mixed into the paste and the mass is extruded through a 3/16" die, forming pieces 1/4" long. The extrudate is dried at 100° C. and then slowly heated to 700° C. over a 4-hour period. The resulting catalyst contains 8.5 percent neodymium and 0.009 percent barium, in oxide forms.

In the foregoing examples the concentration of the neodymium and barium can be readily varied by merely using a different quantity of the neodymium or barium containing materials in relation to the amout of support. A more practical and preferred range of neodymium and barium is from about 1 to about 5 weight percent neodymium in an oxide form and from about 0.01 to about 0.5 weight percent barium in an oxide form impregnated on a suitable support. In another variation, the support may be impregnated with the neodymium and barium salts in separate operations. For example, a zirconia support may be first impregnated with 1 weight percent barium, as barium nitrate, followed by drying, and then with 10 weight percent neodymium, as neodymium nitrate, followed by drying and calcination. If desired, this order can be reversed.

In order to be effective in decomposing oxides of nitrogen the catalysts of this invention must be heated to an elevated temperature. Generally the temperature must be above about 400° C. before the catalysts become active. A generally effective temperature range is from 400–1000° C., and a preferred temperature range is from 700–850° C.

Tests have been carried out to demonstrate the ability of the barium promoted neodymium oxide catalysts to catalyze the decomposition of oxides of nitrogen. In these tests, a stream of helium was passed through a heated catalyst bed and then through a vapor phase chromatograph. The vapor phase chromatograph was adjusted to baseline with the helium stream. A small amount of nitric oxide was then injected into the helium stream ahead of the catalyst bed. The vapor phase chromatograph then determined the composition of the gas stream after contacting the catalyst.

The column of the vapor phase chromatograph elutes only nitrogen, oxygen, and nitric oxide. The formation of additional nitrogen oxides such as $N_2O$, $NO_2$, $N_2O_3$, and the like will not be indicated directly by chromatographic response of the vapor phase chromatograph. On the other hand, these other oxides of nitrogen are absorbed in the column or may even be absorbed on the catalyst itself. This is indicated by a decrease in the amount of oxygen and nitric oxide as compared with the amount of nitrogen shown in the chromatographic response. Because of these side reactions and the limitations of the equipment used in the experiment, only the nitrogen response is a true indication of the decomposition of nitric oxide using the catalyst of this invention. The reason for this is that nitrogen does not take part in the various side reactions indicated above. For example, the oxygen formed by decomposition of nitric oxide to nitrogen and oxygen will react with undecomposed nitric oxide. The resulting dioxide is absorbed and held by the vapor phase chromatograph. The extent of this reaction depends on the relative concentrations of the oxygen and the undecomposed nitric oxide in the test sample after passing over the catalyst. If the nitrogen dioxide reacts further with more nitric oxide, still other oxides of nitrogen are formed which are not eluted. Therefore, a great decrease in the expected oxygen and nitric oxide chromatographic response is observed which does not correspond to the initial decomposition because only the nitrogen has not taken part in these reactions. Only nitrogen can be used to indicate the extent of the decomposition of nitric oxide.

The above test was carried out on barium promoted neodymium oxide catalysts prepared in the manner of Example 1 using the same small amount of nitric oxide injected into the helium stream. The atom ratio of barium to neodymium in the catalysts used in these tests was varied over a wide range. The amount of neodymium and barium added to the catalyst was such that a total of 0.01 gram atoms of metal was impregnated on each 14 grams of support. The catalyst was maintained at 750° C. In all cases, the catalysts effectively decomposed the nitric oxide into nitrogen and oxygen. The results of these tests are shown in the following table in which the chromatographic response is expressed in arbitrary units.

NITRIC OXIDE DECOMPOSITION AT 750° C. BY BARIUM OXIDE-NEODYMIUM OXIDE CATALYSTS ON ZIRCON SPHERES

| Atom ratio Ba/Nd | Chromatographic response | | |
|---|---|---|---|
| | Oxygen | Nitrogen | Nitric oxide |
| No catalyst | | | 4,100 |
| 0:1 | 0 | 960 | (1) |
| 1:100 | 330 | 1,224 | Trace |
| 1:10 | 240 | 1,211 | Trace |
| 1:4 | 58 | 965 | Trace |
| 1:2 | 48 | 971 | 0 |
| 1:0.5 | 0 | 661 | Trace |
| 1:0 | 0 | 32 | 2,380 |

[1] Not determined.

From the above results it is seen that unpromoted neodymium oxide catalyzed the decomposition of nitric oxide to a moderate extent. However, when barium was added in only one atom part per 100 atom part of neodymium, the effectiveness of the neodymium was greatly increased. The amount of nitrogen in the exit gas formed by the decomposition of nitric oxide increased from 960 units to 1224 units—a 27.5 percent increase. The promoter effect of barium was observed at atom ratios from 1:2 to 1:100 atoms of barium to neodymium. However, at the ratio of from about 1:10 to about 1:100 the superior nature of the invention is clear. Therefore, the method of decomposing an oxide of nitrogen comprising contacting it with a catalyst consisting essentially of from 0.001 to 15 weight percent neodymium in an oxide form and from 0.0001 to 1.5 weight percent barium in an oxide form impregnated on a suitable support, said catalyst having an atom ratio of barium to neodymium of from about 1:10 to about 1:100, at a temperature above about 400° C. is a preferred embodiment of this invention. When the catalyst contained only barium oxide and no neodymium oxide, the exit gas was almost unchanged; only 32 units of nitrogen formed and the amount of nitric oxide increased from only trace amounts to 2380 units.

When using the catalyst of this invention to decompose the nitrogen oxides in the exhaust stream of an internal combustion engine, it is preferred that the engine be operated at an air/fuel ratio below about 14 in order to obtain maximum effectiveness. At leaner ratios the large amount of oxygen in the exhaust stream reduces the ability of the catalyst to decompose nitrogen oxides.

In order to use the catalyst in an internal combustion engine exhaust system, the catalyst is incorporated in a suitable manner into the exhaust system of the engine. One method commonly used is to place the catalyst in a so-called "catalytic muffler." Examples of these are disclosed in U.S. Pats. 3,154,389, 3,149,925, 3,149,926 and 3,146,073, among others. Essentially these are containers having an opening to receive and discharge the exhaust gas. To firmly retain the catalyst material, the receiving and discharge openings are covered with wire screen. The container may have internal baffling to allow greater contact between catalyst and exhaust gas or to use the hot reaction gases to heat the incoming exhaust gases. The container may actually replace the vehicle muffler or may be incorporated into the conventional exhaust system of current vehicles. The catalyst bed may also be located in the exhaust manifold of the engine.

The barium oxide promoted neodymium oxide catalysts may be used by themselves, as mixtures, or they may be used in conjunction with a second catalyst whose function is to oxidize the hydrocarbon or carbon monoxide constituents of the exhaust gas. A catalyst eminently suited for this purpose is a supported copper-palladium catalyst as described in U.S. Pat. 3,224,981. The barium oxide promoted neodymium oxide catalysts may be intimately mixed with the oxidation catalyst or the different catalysts may be stratified.

When used to decompose oxides of nitrogen in streams other than the exhaust stream of internal combustion engines, the catalyst is merely incorporated in the oxide of nitrogen-containing stream so that intimate contact is obtained between the catalyst and the oxides of nitrogen. For example, in the discharge stream of a nitric acid plant employing the amonia process for synthesizing nitric acid, the spent gas containing nitric oxide is passed through the barium oxide promoted neodymium oxide catalyst bed and the temperature of the bed maintained at a temperature of from about 400 to 1000° C.

I claim:

1. A method of decomposing nitric oxide comprising contacting a gas stream containing said nitric oxide with a catalyst consisting essentially of from about 0.001 to about 15 weight percent neodymium in an oxide form and from about 0.0001 to about 1.5 weight percent barium in an oxide form impregnated on a suitable support, said catalyst having an atom ratio of barium to neodymium of from about 1:10 to about 1:100, at a temperature above about 400° C.

2. The method of claim 1 wherein said support comprises a substantial amount of zirconia.

3. The method of claim 1 wherein said support comprises a substantial amount of zinc oxide.

4. The method of claim 1 wherein said support comprises a substantial amount of zircon.

5. The method of claim 1 wherein said gas stream is the exhaust gas of an internal combustion engine.

6. The method of claim 1 wherein said catalyst consists essentially of from about 1 to about 5 weight percent neodymium in an oxide form and from about 0.01 to about 0.5 weight percent barium in an oxide form impregnated on a suitable support, said catalyst having an atom ratio of from about 1:10 to about 1:100.

References Cited
UNITED STATES PATENTS

| | | | |
|---|---|---|---|
| 3,483,138 | 12/1969 | Stephens | 423—239 X |
| 3,459,494 | 8/1969 | Harris et al. | 423—239 |

EARL C. THOMAS, Primary Examiner

U.S. Cl. X.R.

423—213, 351, 579